United States Patent [19]

Theodorides

[11] Patent Number: 5,801,334
[45] Date of Patent: Sep. 1, 1998

[54] CONDUCTOR (TURN) INSULATION SYSTEM FOR COILS IN HIGH VOLTAGE MACHINES

[76] Inventor: Demetrius C. Theodorides, 3002 Sunny Slope Rd., Bridgewater, N.J. 08807

[21] Appl. No.: 519,595

[22] Filed: Aug. 24, 1995

[51] Int. Cl.$^6$ .................................................. H01F 27/28
[52] U.S. Cl. .............................. 174/120 SR; 335/299; 336/223
[58] Field of Search .................. 174/120 SR; 335/299; 336/222, 223

[56] References Cited

U.S. PATENT DOCUMENTS

| | | | |
|---|---|---|---|
| 2,071,977 | 2/1937 | Herrick | 310/208 |
| 2,201,845 | 5/1940 | Wieseman | 310/208 |
| 2,570,786 | 10/1951 | Flynn et al. | 156/190 |
| 2,829,354 | 4/1958 | Sealey | 336/223 |
| 2,935,631 | 5/1960 | Jones | 310/208 |
| 3,431,639 | 3/1969 | Reimer et al. | 29/605 |
| 3,735,168 | 5/1973 | Anderson et al. | 310/200 |
| 3,775,628 | 11/1973 | Andersson et al. | 310/208 |
| 3,860,744 | 1/1975 | Schuler | 174/117 FF |
| 4,270,112 | 5/1981 | Schneider-Muntau et al. | 336/223 |
| 4,489,298 | 12/1984 | Hall | 336/223 |
| 4,724,600 | 2/1988 | Studniarz et al. | 29/596 |
| 5,099,159 | 3/1992 | Liptak et al. | 310/45 |
| 5,416,373 | 5/1995 | Maruyama et al. | 310/208 |

*Primary Examiner*—Kristine L. Kincaid
*Assistant Examiner*—Marc D. Machtinger

[57] ABSTRACT

An insulation system for the turns of a multiturn coil in a high voltage electrical generator or motor having the outer strands of each turn insulated with a high dielectric strength material such as mica and having the inner strands insulated with a low dielectric strength material such as double dacron glass (DDG) or single dacron glass (SDG). The outer mica insulated strands of the turn are smaller in width than the inner DDG or SDG insulated strands in order to accommodate the differences in thickness between the mica, DDG, SDG or other materials used for strand insulation and in order to create a higher overall dielectric strength in the ground insulation of the coils. The outer mica insulated strands of the turn are different in thickness from the inner DDG or SDG insulated strands in order to minimize the Eddy and Circulating Current Losses of the winding and in order to accommodate the differences between the mechanical strengths of the mica and the DDG/SDG tapes. More than one outer top or bottom strands can be insulated with mica in order to accommodate generator or motor designs and applications where the turn to turn voltages or the expected turn to turn voltage surges are exceptionally high.

5 Claims, 1 Drawing Sheet

CONDUCTOR (TURN) INSULATION SYSTEM FOR COILS IN HIGH VOLTAGE MACHINES

BACKGROUND AND SUMMARY OF THE INVENTION

This invention relates to high voltage hydroelectric generator multiturn coils and more particularly to a new and improved turn insulation system having a higher dielectric strength insulation on the outer strands of the turn and a lower dielectric strength insulation on the inner strands. The invention may also be applied to other dynamoelectric machines such as turbine generators or synchronous and large AC induction motors in which multiturn coils are used for the stator winding.

Multiturn coils, constituting the stator windings in many high voltage dynamoelectric machines, are constructed of two or more turns, each composed of several individually insulated copper strands. These strands are usually given a low dielectric strength insulation in order to withstand the low strand to strand voltages generated within the turns in these machines. This strand insulation usually consists of one or more taped layers of dacron glass or other similar low dielectric strength materials.

It is known that the operating voltages of these machines generate much higher voltages between adjacent turns than between adjacent strands within each turn. It is also known that voltage surges or steep front impulses can occur in high voltage machines which result in relatively high voltages occurring between adjacent turns in a coil. Such relatively high operating voltages combined with the high voltage impulses can result in a turn to turn insulation failure. U.S. Pat. No. 2,201,845, May 21, 1940 describes a method of placing coils in the winding so that coils with high turn to turn insulation are located near the high voltage end of the electric parallel whereas coils with lower turn to turn insulation are located near the low voltage end of the electric parallel. Of some interest as a background to this invention is also U.S. Pat. No. 4,724,600, Feb. 16, 1988 in which a turn insulation system is described in which groups of several turns are separately insulated in order for the winding to withstand the turn to turn voltages. Both the above inventions, however, are designed for insulation systems utilizing relatively low dielectric strength materials for strand insulation and they both result in an expensive to manufacture and complicated to install winding. Another invention, which explains some of the manufacturing difficulties associated with the utilization of the one or more dedicated layers of mica turn insulation is U.S. Pat. No. 5,099,159, Mar. 24, 1992. These manufacturing difficulties are, it is explained the Patent, at the root of the failures in high voltage coils which failures have been attributed in the literature to turn to turn electrical shorts. The turn mica tape described in the invention is, however, expensive and difficult to manufacture and apply.

Most present day manufacturers of high voltage coils that utilize double dacron glass (DDG), single dacron glass (SDG) or other low dielectric strength strand insulation apply one or more dedicated taped layers of relatively higher dielectric strength material such as mica on all the turns of all the coils they manufacture for a particular machine and rely on the number of these dedicated taped layers of mica to protect the winding from the expected operating voltages and voltage surges. Some of the difficulties associated with this method are described in the Patents previously mentioned and are well documented in the literature.

Alternatively, some manufacturers utilize exclusively mica tape—rather than DDG or SDG—on every individual copper strand within a turn, thus relying on the same mica strand insulation to protect the coils from both the lower strand to strand voltages as well as from the much higher turn to turn voltages. It is the primary object of this invention to provide an improved turn insulation system having a mica strand insulation on the outer strands of the turn and a DDG, SDG or other similar low dielectric strength strand insulation on all other inner strands.

It is another object of this invention to provide an improved turn insulation system having the mica insulated outer strands of each turn generally smaller in width than the remaining DDG or SDG insulated inner strands so that the overall insulated width of both outer and inner strands becomes the same.

It is a further object of this invention to provide an improved turn insulation system having the mica insulated outer strands of each turn different in thickness from the remaining DDG or SDG insulated inner strands so that the thickness of each of the two types of strands can be independently selected on the basis of which thickness—and which width to thickness ratio—is electrically and mechanically the most appropriate.

These and other objects of this invention will be apparent to those skilled in the art from the summary and description of the invention which follows.

DESCRIPTION OF THE PREFERRED EMBODIMENTS

Figure 1:
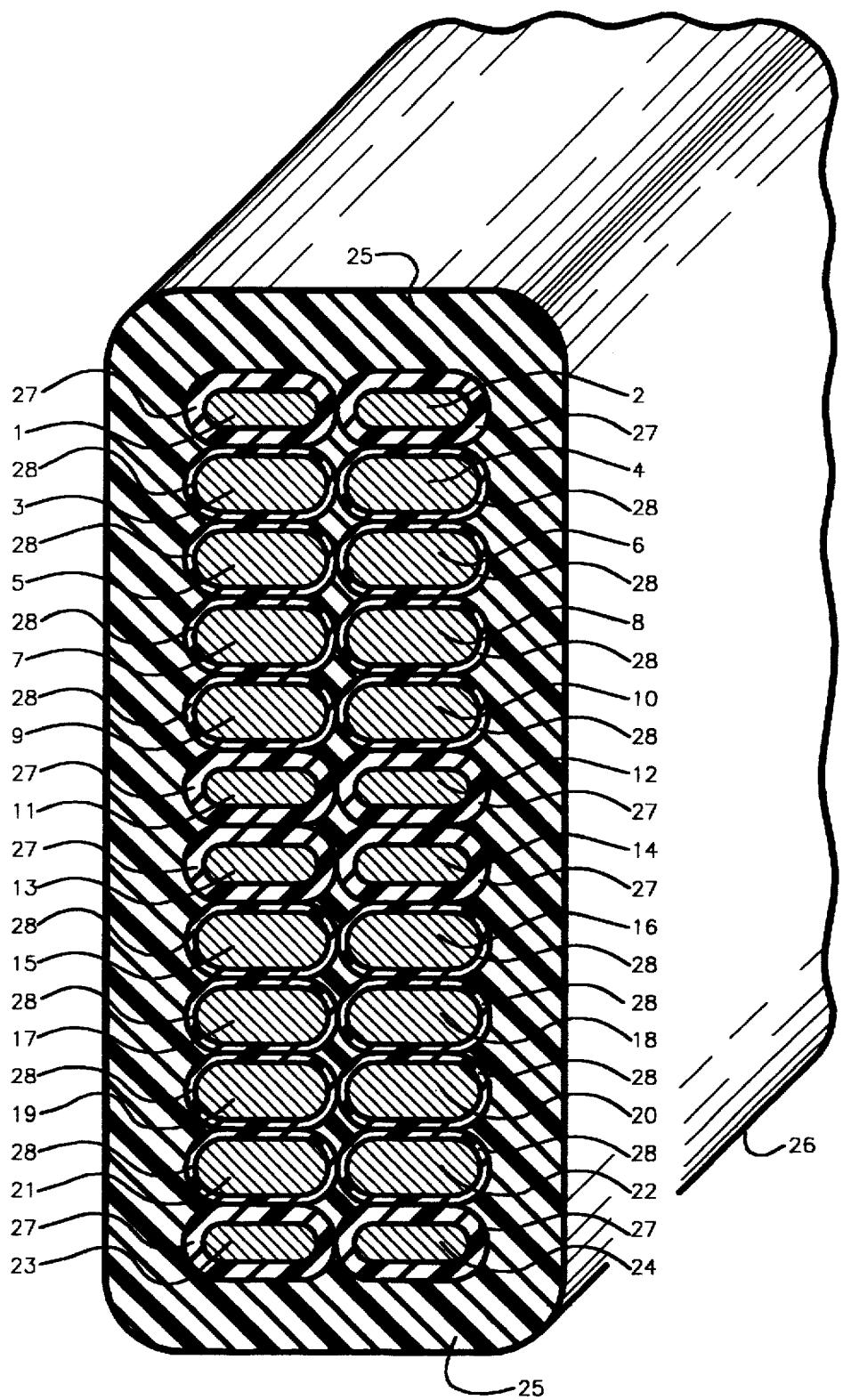
FIG. 1 is a perspective view of a small section of a high voltage insulated multiturn coil which includes a cross-section view of the coil revealing the details of the strands, the turns and their insulation according to the insulation system of this invention. The particular coil shown in FIG. 1 is constructed with two (2) turns each made up of six (6) strands vertically and two (2) strands horizontally. It is clear that a coil of two (2) turns each made up of six (6) vertical and two (2) horizontal strands, depicted in FIG. 1, is selected as a preferred example only and that this invention is equally applicable to a coil constructed of more than two turns each of which is made up of any number of strands.

The insulation system of this invention, indicated generally in FIG. 1, includes a multiturn coil 26 constructed with two (2) turns. The top turn is made up of the outer strands 1, 2, 11 and 12 and of the inner strands 3, 4, 5, 6, 7, 8, 9 and 10. The bottom turn is made up of the outer strands 13, 14, 23 and 24 and of the inner strands 15, 16, 17, 18, 19, 20, 21 and 22. The two turns are enclosed within and completely surrounded by the high voltage insulation wall 25. The outer strands of both turns 1, 2, 11, 12, 13, 14, 23 and 24 are all insulated with the relatively thick mica strand insulation 27 whereas the inner strands of both turns 3, 4, 5, 6, 7, 8, 9, 10, 15, 16, 17, 18, 19, 20, 21 and 22 are all insulated with the relatively thin DDG or SDG insulation 28.

FIG. 1 discloses that the boundary region between the two turns is so insulated that the boundary strands 11 and 12 of the top turn and the boundary strands 13 and 14 of the bottom turn are separated from each other by at least a double layer of the mica or other high dielectric strength strand insulation 27. As a result of this arrangement, this novel turn insulation system offers an improved turn to turn insulation strength which—as has been verified in exhaustive testing—is superior in performance to the corresponding turn to turn insulation strength provided by the usual system constructed only with DDG, SDG or other low dielectric strength strand insulation on all the strands plus one or two additional mica tapes applied over the entire turn.

FIG. 1 also discloses that the inner strands of both top and bottom turns 3, 4, 5, 6, 7, 8, 9, 10, 15, 16, 17, 18, 19, 20, 21 and 22, which are insulated with DDG, SDG or other low dielectric strength strand insulation 28, are wider than the outer strands 1, 2, 11, 12, 13, 14, 23 and 24 which are insulated with mica or other high dielectric strength strand insulation 27. As a result of this arrangement more copper is utilized in coils constructed with this new insulation system than in coils constructed with the insulation system using mica insulation on all strands of the turns.

FIG. 1 further shows that the outer corner strands 1 and 2 of the top turn and the outer corner strands 23 and 24 of the bottom turn have more mica separating the copper of these corner strands from the nearest outer edge of the high voltage insulation wall 25 of the coil than there is between the copper of the inner strands 3, 4, 5, 6, 7, 8, 9, 10, 15, 16, 17, 18, 19, 20, 21, and 22 and the corresponding nearest outer edge of the high voltage insulation wall 25. It is well known in the industry that because of the concentrated electric field established in the corners of the coils and, also, because of usual manufacturing difficulties associated with the taping operation of the high voltage insulation wall 25—which manufacturing difficulties often result in a high voltage insulation wall 25 which is actually thinner at the four corners than it is on the flat sides of the coil—these four corners constitute the weakest dielectric strength areas of the high voltage insulation wall 25. As a result of the arrangement of this invention a significantly increased ground wall dielectric strength is achieved.

FIG. 1 also discloses that the vertical thickness of the outer strands 1, 2, 11, 12, 13, 14, 23 and 24 of the top and bottom turns is different from the vertical thickness of the inner strands 3, 4, 5, 6, 7, 8, 9, 10, 15, 16, 17, 18, 19, 20, 21 and 22 of the top and bottom turns. It is known that the mica tape used to construct the mica strand insulation 27 has a different mechanical strength than the DDG or SDG tape used to construct the DDG or SDG strand insulation 28. It is also known that during the design of the coils for high voltage generators and motors, the width and the thickness of the strands are selected so as to minimize the machine losses associated with Eddy Currents and Circulating Currents. As a result of the arrangement of this invention the thickness of the outer strands are selected different from the thickness of the inner strands thus providing the optimum strand thickness to match the mechanical strength of the mica or DDG /SDG tapes and to also minimize the Eddy Current and the Circulating Current losses of the high voltage generator or motor.

Although the preferred construction shown in FIG. 1 discloses that only the top and the bottom outer strands 1, 2, 11 and 12 of the top turn and only the top and bottom outer strands 13, 14, 23 and 24 of the bottom turn are insulated with mica or other high dielectric strength insulation, it must be stated that on the rare occasions in which the turn to turn operating voltage of the generator or motor is very high or when the expected surges are exceptionally steep and high, then it may be necessary that additional protection is required between the turns than that provided by the mica or other high dielectric strength insulation placed on the single outer top strand and the single outer bottom strand of each turn. In these rare occasions one or more additional strands—adjacent to the outer top strand or to the outer bottom strand—are utilized which additional strands also are insulated with mica or other high dielectric strength insulation instead of the DDG, SDG or other low dielectric strength insulation they would normally have according to this invention.

What is claimed is:

1. An insulation system for windings of high voltage dynamoelectric machines comprising:

a multiturn coil having a substantially rectangular cross-section, said rectangular cross-section having a long side, a short side, a vertical axis corresponding to said long side and a horizontal axis corresponding to said short side;

an insulation wall completely encasing the multiturn coil;

the multiturn coil being constructed from at least two identical insulated turns formed by spirally winding along the vertical axis of the coil an elongated multi-strand conductor;

each of said at least two identical insulated turns comprising one or more stacks of insulated copper strands, said one or more stacks forming a row along the horizontal axis of the coil and said insulated copper strands being stacked along the vertical axis of the coil;

each of said one or more stacks of insulated copper strands comprising a top strand insulated with mica or other high dielectric strength insulation, a bottom strand insulated with mica or other high dielectric strength insulation and at least one inner strand therebetween insulated with double dacron glass, single dacron glass or other low dielectric strength insulation.

2. The insulation system of claim 1 wherein the width of the top strand of each of the stacks of insulated copper strands and the width of the bottom strand of each of the stacks of insulated copper strands is smaller than the width of said at least one inner strand.

3. The insulation system of claim 1 wherein the thickness of the top strand of each of the stacks of insulated copper strands and the thickness of the bottom strand of each of the stacks of insulated copper strands is different from the thickness of said at least one inner strand.

4. An insulation system for windings of high voltage dynamoelectric machines comprising:

a multiturn coil having a substantially rectangular cross-section, said rectangular cross-section having a long side, a short side, a vertical axis corresponding to said long side and a horizontal axis corresponding to said short side;

an insulation wall completely encasing the multiturn coil;

the multiturn coil being constructed from at least two identical insulated turns formed by spirally winding along the vertical axis of the coil an elongated multi-strand conductor;

each of said at least two identical insulated turns comprising one or more stacks of insulated copper strands, said one or more stacks forming a row along the horizontal axis of the coil and said insulated copper strands being stacked along the vertical axis of the coil;

each of said stacks of insulated copper strands comprising two or more adjacent strands, located at the top of each of the stacks, insulated with mica or other high dielectric strength insulation, a bottom strand insulated with mica or other high dielectric strength insulation and at least one inner strand therebetween insulated with double dacron glass, single dacron glass or other low dielectric strength insulation.

5. An insulation system for windings of high voltage dynamoelectric machines comprising:
- a multiturn coil having a substantially rectangular cross-section, said rectangular cross-section having a long side, a short side, a vertical axis corresponding to said long side and a horizontal axis corresponding to said short side;
- an insulation wall completely encasing the multiturn coil;
- the multiturn coil being constructed from at least two identical insulated turns formed by spirally winding along the vertical axis of the coil an elongated multi-strand conductor;
- each of said identical insulated turns comprising one or more stacks of insulated copper strands, said one or more stacks forming a row along the horizontal axis of the coil and said insulated copper strands being stacked along the vertical axis of the coil;
- each of said one or more stacks of insulated copper strands comprising a top strand insulated with mica or other high dielectric strength insulation, two or more adjacent strands, located at the bottom of the stacks, insulated with mica or other high dielectric strength insulation and at least one inner strand therebetween insulated with double dacron glass, single dacron glass or other low dielectric strength insulation.

* * * * *